United States Patent [19]
Peterson

[11] Patent Number: 6,155,687
[45] Date of Patent: Dec. 5, 2000

[54] LIGHT GUIDE FOR USE IN A COLOR WHEEL DISPLAY SYNCHRONIZATION APPARATUS AND METHOD

[75] Inventor: Mark Peterson, Lake Oswego, Oreg.

[73] Assignee: InFocus Corporation, Wilsonville, Oreg.

[21] Appl. No.: 09/354,998

[22] Filed: Jul. 16, 1999

[51] Int. Cl.[7] .................................................. G03B 21/14
[52] U.S. Cl. ................. 353/84; 353/31; 348/743
[58] Field of Search .................................. 353/31, 81, 84, 353/98; 348/742, 743, 771; 349/5, 7, 18

[56] References Cited

U.S. PATENT DOCUMENTS

| | | | |
|---|---|---|---|
| 5,467,146 | 11/1995 | Huang et al. | 348/743 |
| 5,680,180 | 10/1997 | Huang | 348/656 |
| 5,805,243 | 4/2000 | Hatano et al. | 353/84 |
| 5,905,545 | 5/1999 | Poradish et al. | 348/743 |
| 5,917,558 | 6/1999 | Stanton | 348/743 |
| 5,967,636 | 10/1999 | Stark et al. | 353/84 |
| 6,005,722 | 12/1999 | Butterworth et al. | 353/84 |
| 6,054,832 | 4/2000 | Kunzman et al. | 348/743 |

*Primary Examiner*—William Dowling
*Attorney, Agent, or Firm*—Stoel Rives LLP

[57] ABSTRACT

A multimedia projector (110) employing a color wheel (120) uses a light guide (152) to transmit light from the color wheel to a photo detector (156) that detects a particular color or colors of light to provide a index mark signal to a display controller (56) to synchronize red, green, and blue image data with the associated color wheel filter segments. An integrator tunnel (122) adjacent to the light guide provides uniform, high intensity light from the color wheel to a display device, such as a DMD (130). The photo detector senses otherwise wasted light rays as sensing rays (150) that are reflected by a light source reflector (114) and propagated through the color wheel. To collect some of the sensing rays, the light guide is preferably bonded to the integrator tunnel. The light guide has a slanted output end (154) that reflects the collected sensing rays toward a photo detector on a circuit board (148). Because the light guide is bonded to the integrator tunnel, and because the color wheel rotates its filter segments from the light guide toward the integrator tunnel, the photo detector senses color changes slightly before they are received by the DMD, which is advantageous because the resulting predictive timing is consistent from one projector to the next, thereby eliminating timing adjustments.

19 Claims, 8 Drawing Sheets

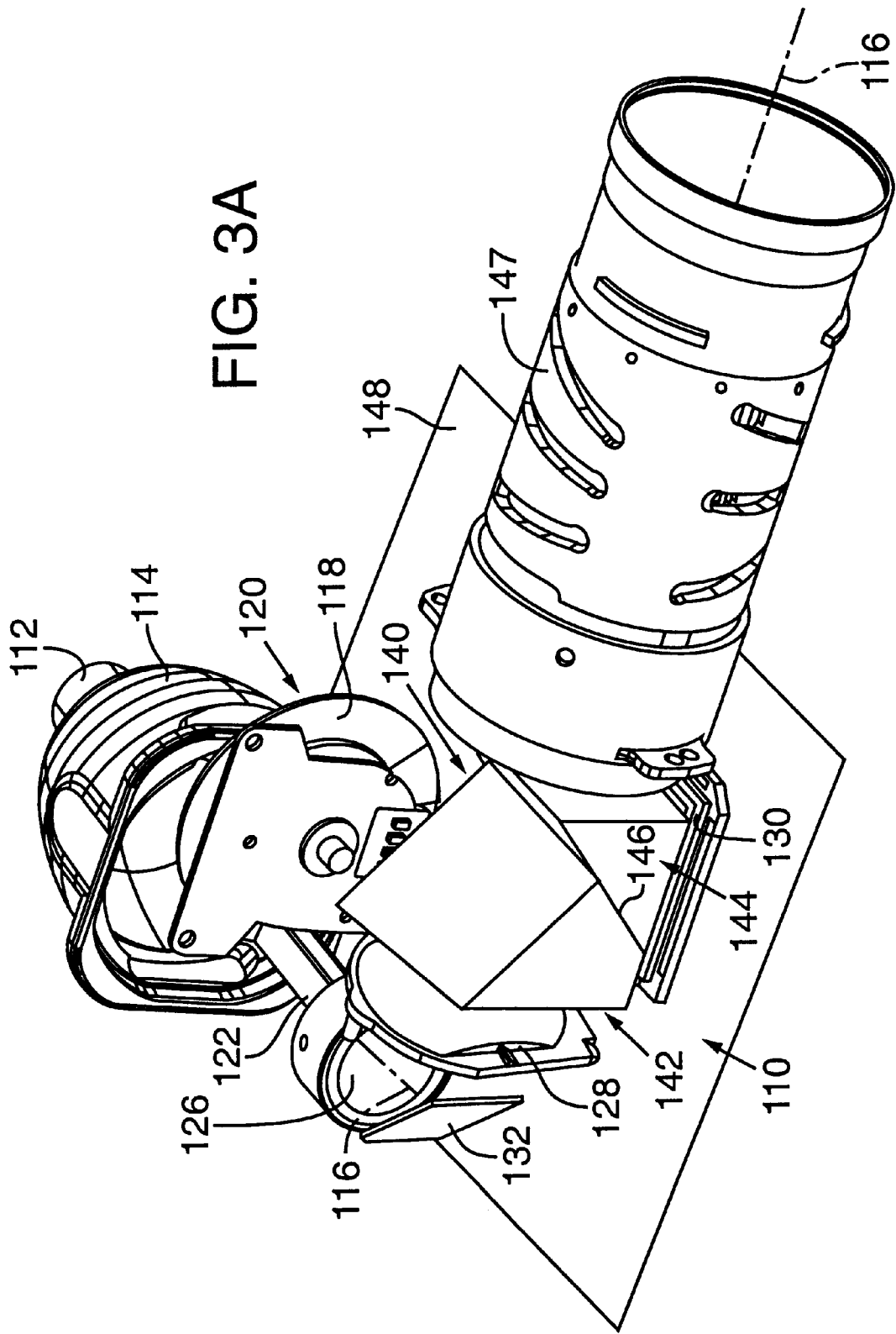

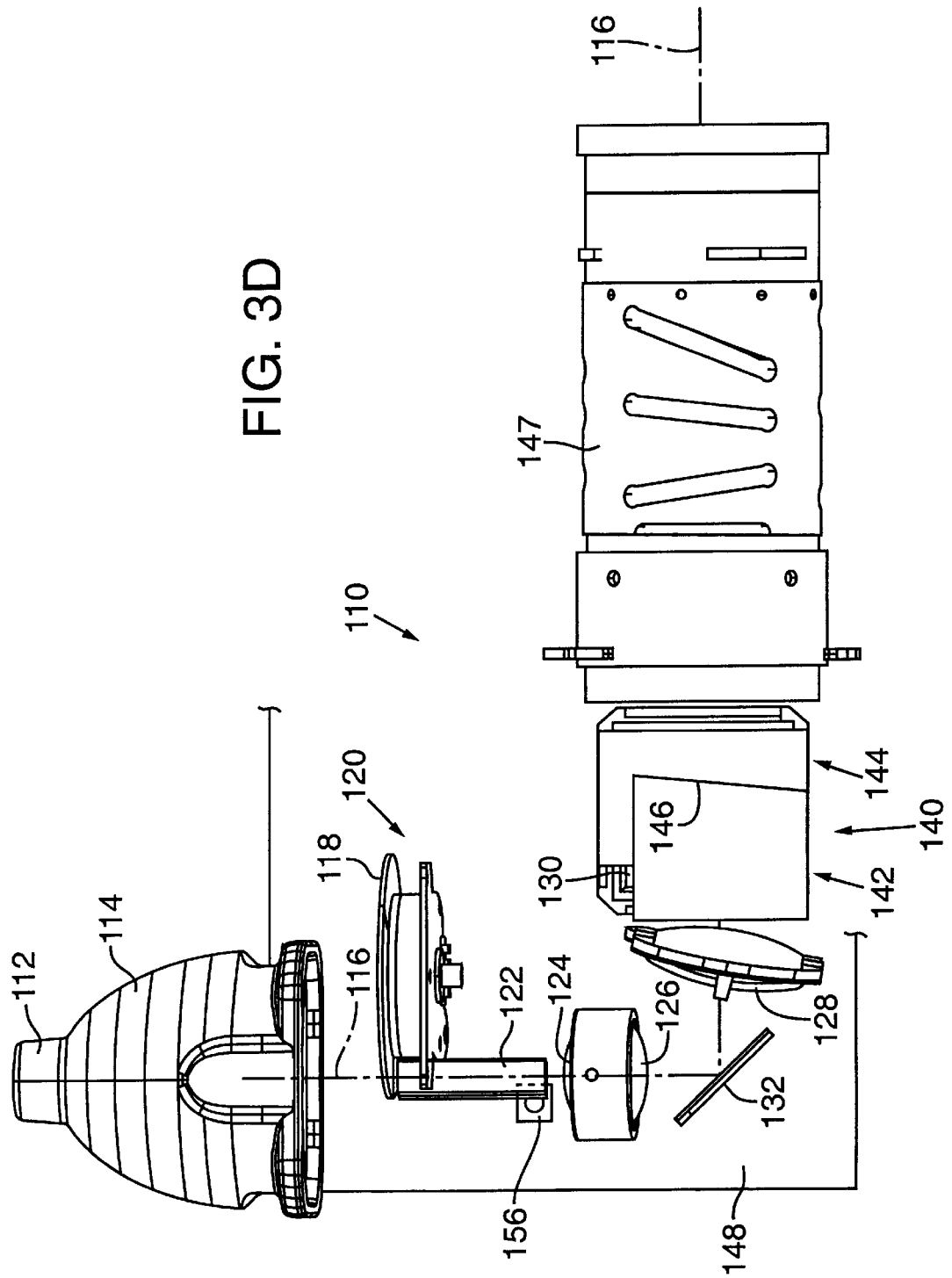

LIGHT GUIDE FOR USE IN A COLOR WHEEL DISPLAY SYNCHRONIZATION APPARATUS AND METHOD

TECHNICAL FIELD

This invention relates to image projection displays and more particularly to a color wheel synchronization technique employed in an optical pathway of such displays.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals that control a digitally driven image-forming device, such as a liquid crystal display ("LCD") or a digital micro mirror device ("DMD").

A popular type of multimedia projection system employs a light source and optical path components upstream and downstream of the image-forming device to project the image onto a display screen. An example of a DMD-based multimedia projector is the model LP420 manufactured by In Focus Systems, Inc., of Wilsonville, Oreg., the assignee of this application.

Significant effort has been invested into developing projectors producing bright, high-quality, color images. However, the optical performance of conventional projectors is often less than satisfactory. For example, suitable projected image brightness is difficult to achieve, especially when using compact portable color projectors in a well-lighted room.

Because LCD displays have significant light attenuation and triple path color light paths are heavy and bulky, portable multimedia projectors typically employ DMD displays in a single light path configuration. Producing a projected color image with this configuration typically requires projecting a frame sequential image through some form of sequential color modulator, such as a color wheel.

The use of color wheels in frame sequential color ("FSC") display systems has been known for many years and was made famous (or infamous) in early attempts to develop color television sets. With technological advances, however, color wheel display implementations are still useful today.

FIG. 1 shows a typical prior art FSC display system 10 in which a sensor 12 senses a timing mark 14 to detect a predetermined color index position of a motor 16 that rotates a color wheel 18 having respective red, green, and blue filter segments R, G, and B. A light source 20 projects a light beam 22 through color wheel 18 and a relay lens 24 onto a display device 26, such as an LCD-based light valve or a DMD. A display controller (not shown) drives display device 26 with sequential red, green, and blue image data that are timed to coincide with the propagation of light beam 22 through the respective filter segments R, G, and B of color wheel 18. Clearly, successful operation of a FSC display system depends on properly synchronizing the red, green, and blue image data to the angular position of color wheel 18.

Sensor 12 typically employs any of optoelectrical or electro mechanical shaft position or motor armature position detectors and usually requires some means for aligning timing mark 14 to the start of one of the filter segments. This alignment is typically a costly and error prone mechanical adjustment that accounts for angular differences between motor 16 and the mechanical mounting of filter segments R, G, and B. Of course, electrical or mechanical delays associated with sensor 12 further contribute to alignment errors.

The accumulated angular errors open the possibility of synchronization errors between the red, green, and blue image data to the angular position of color wheel 18, a possibility that prior workers avoided by building a timing duty cycle into the display controller electronics. The timing duty cycle provides for driving display device 26 with the red, green, and blue image data for only a portion of the time when light beam 22 is propagating through each of respective filter segments R, G, and B, thereby preventing illuminating display device 26 with an improper color. Unfortunately, the timing duty cycle reduces the total amount of illumination available for displaying each color and, therefore, reduces the brightness of the resultant displayed color image.

A solution for minimizing color wheel synchronization errors is described in copending U.S. Pat. application Ser. No. 09/136,799, filed Aug. 19, 1998, for COLOR WHEEL SYNCHRONIZATION APPARATUS AND METHOD, which is assigned to the assignee of this application. FIG. 2, which is duplicated herein, shows a multimedia projector 30 in which a light source 32 emits polychromatic light that propagates along a folded optical path 34 through projector 30. Light source 32 is a metal halide arc lamp 36 with an integral elliptical reflector 38. Optical path 34 includes a condenser lens 40, a color wheel 42, an airspace doublet lens 44, a fold mirror 46, a relay lens 48, a display device 50, and a projection lens 52. The optical components are held together by an optical frame 54 that is enclosed within a projector housing (not shown). A display controller 56 receives color image data from a PC 58 and processes the image data into frame sequential red, green, and blue image data, sequential frames of which are conveyed to DMD 50 in proper synchronism with the angular position of color wheel 42. A power supply 60 is electrically connected to light source 32 and display controller 56 and also powers a cooling fan 62 and a free running DC motor 64 that rotates color wheel 42. Display controller 56 controls display device 50 such that light propagating from relay lens 48 is selectively reflected either toward projection lens 52 or toward a light-absorbing surface 66 mounted on or near optical frame 54.

DC motor 64 rotates color wheel 42 at about 6,650 to 7,500 rpm. Color wheel 42 includes color filter segments R, G, and B that each surround about 120 degrees of color wheel 42. Color wheel synchronization is achieved by detecting which color filter segment is in optical path 34 and for how long. Particular colors of light propagating through color wheel 42 are sensed to generate synchronization timing data. In particular, a color selective light sensor 68 is positioned off optical path 34 and adjacent to relay lens 48 to receive light scattered off fold mirror 46, a position that does not intercept any ultimately projected light. Light source 32 has sufficient intensity to allow receiving scattered light at various locations within optical frame 54.

However, the applicant has discovered that the above-described color wheel synchronizing solution is not suitable for use in certain multimedia projectors. For example, to achieve form factor goals and increase output lumens, some multimedia projectors pass light through light integrating devices, such as a solid glass integrator rod, which minimizes or eliminates extra unused light downstream of the color wheel. Accordingly, there is no convenient place to position a photo detector without robbing the DMD of lumens. The above-described photo detector also protrudes into an area adjacent to the light path, rendering it vulnerable to breakage. Furthermore, the photo detector is connected to the display controller by a cable and connector assembly that is costly and requires undue assembly. Moreover, the photo detector senses the color change at the same time as the DMD, which requires timing adjustments to ensure correct synchronization of color wheel color changes and the frame sequential color images driving the DMD.

What is needed, therefore, is a color wheel synchronization technique that circumvents the above-described problems and substantially eliminates any mechanical, optical, and electrical rotational timing errors that are intrinsic to prior color wheel systems.

SUMMARY OF THE INVENTION

An object of this invention is, therefore, to provide an apparatus and a method for detecting an angular position of a color wheel in an FSC display system.

Another object of this invention is to provide a lighter weight, simpler, and less costly color wheel synchronization system for a multimedia projector.

A multimedia projector employing a color wheel in an FSC display system employs a light guide to transmit light propagated through the color wheel to a photo detector that detects a particular color or colors of light to provide an accurate index mark signal to a display controller to ensure that the appropriate red, green, and blue image data are properly synchronized with the associated color wheel filter segments. An integrator tunnel adjacent to the light guide provides uniform, high intensity light from the color wheel to a display device, such as a DMD.

The photo detector senses otherwise wasted light rays as sensing rays that are reflected by a light source reflector and propagated through the color wheel at a predetermined locations adjacent to the integrator tunnel. To collect some of the sensing rays, the light guide is preferably bonded to the integrator tunnel. The light guide is formed from solid glass, operates by total internal reflection ("TIR"), and has a slanted output end that reflects the sensing rays toward a photo detector on a circuit board.

Because the light guide is bonded to the integrator tunnel, and because the color wheel rotates its filter segments from the light guide toward the integrator tunnel, the photo detector senses color changes slightly before they are received by the DMD. This is advantageous because the resulting predictive timing is consistent from one projector to the next, thereby eliminating timing adjustments.

Employing the light guide is also advantageous because it is firmly bonded against the integrator tunnel, which strengthens them both and reduces their vulnerability to breakage during assembly and servicing.

Employing the light guide is further advantageous because it reflects the sensing rays through the air towards the photo detector, which is separately mounted on the circuit board. Because the light guide and photo detector are separated, there is a much reduced chance of damaging either of them during assembly or servicing. Moreover, this protection comes without the cost of an additional connector and cabling and their associated assembly and testing.

Additional objects and advantages of this invention will be apparent from the following detailed description of preferred embodiments thereof that proceed with reference to the accompanying drawings.

BRIEF DESCRIPTION OF THE DRAWINGS

FIGS. 3A, 3B, 3C, 3D, and 3E are respective isometric, frontal, side elevation, top plan, and rear end views of a preferred embodiment of this invention.

DETAILED DESCRIPTION OF PREFERRED EMBODIMENTS

Figure 1:
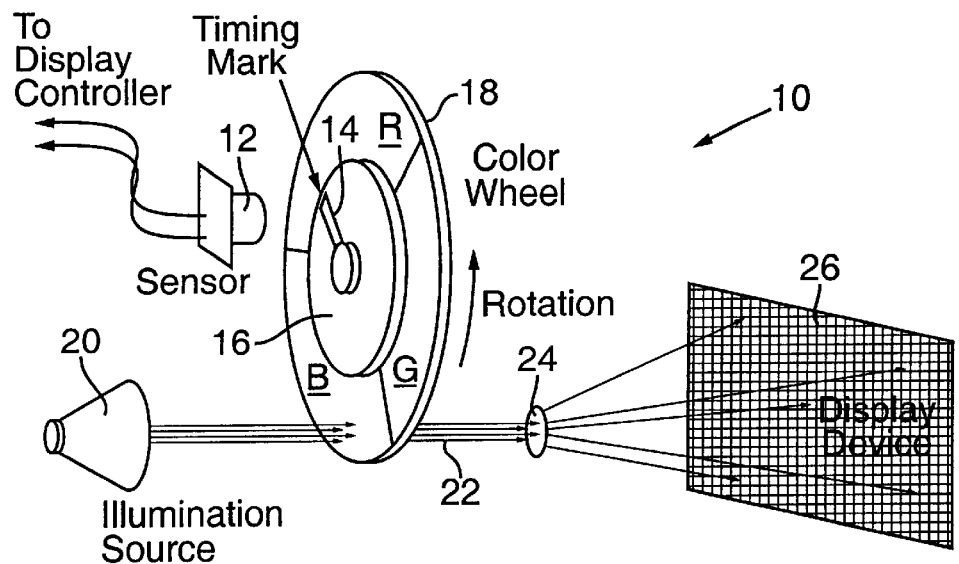
FIG. 1 is a simplified pictorial diagram showing the operating principle of a prior art FSC display device employing a color wheel having an optoelectrically sensed timing mark.

FIGS. 3A, 3B, 3C, 3D, and 3E are respective isometric, frontal, side elevation, top plan, and rear end views of a preferred embodiment of an image projection system 110 of this invention that includes a high power lamp 112 positioned at a focus of an elliptical reflector 114 having an F-number of approximately F/1 to produce a high intensity illumination beam that is characterized by a principal ray 116. High power lamp 112 is preferably a 120 watt, high pressure mercury arc lamp, which is suitable for use in an image projector to achieve its lifetime and lumen specifications. The mercury arc lamp has a nominal 1.3 mm arc gap, which contributes to high efficiency operation of the projector engine of image projection system 110. The small size of the arc gap impacts the alignment of the lamp arc to the rest of the optical system and increases the importance of the stability of the arc itself.

Lamp 112 is positioned at the first focus of elliptical reflector 114, which has a cold mirror that reflects forward only visible light. Much of the infrared and ultraviolet light is transmitted and absorbed in the housing of elliptical reflector 114. The second focus of elliptical reflector 114 is positioned one-half the distance between the front face of a rotating color wheel disk 118 of a color wheel assembly 120 and an integrator tunnel 122. As shown best in FIGS. 3B and 3E, elliptical reflector 114 is tilted upwardly 5 degrees from a horizontal datum plane to minimize the height of projection system 110. Color wheel disk 118 rotates at about 7,200 rpm, which is twice the system video image refresh rate, to sequentially display red, green, and blue images on a projector screen (not shown). Color wheel disk 18 may also include a white segment that functions to increase lumens while decreasing color saturation. All segments of color wheel disk 118 carry ultraviolet reflective coatings to prevent ultraviolet light from reaching ultraviolet light sensitive components in the optical system.

Integrator tunnel 122 creates at its output end a uniform illumination pattern and facilitates delivering the illumination light past the motor of color wheel assembly 120 so that the motor does not create a shadow in the illumination. Integrator tunnel 122 is composed of a solid glass rod that relies on total internal reflection to transfer light through it. Integrator tunnel 122 may also include a cladding that supports the integrator tunnel without disrupting total internal reflection. The uniform illumination pattern of light propagating from the output end of integrator tunnel 122 is of rectangular shape and is imaged through lens elements 124, 126, and 128 onto a light reflecting surface of a DMD 130. Integrator tunnel 122 is rotated 8 degrees about it major axis to correct for rotation in the illumination on DMD 130, which rotation is caused by a prism assembly 140 described below.

DMD 130 is preferably a Texas Instruments Model DMD 1076 spatial light modulator composed of a rectangular array of aluminum micro mechanical mirrors, each of which can be individually deflected at an angle of ±10 degrees about a hinged diagonal axis. The deflection angle (either positive or negative) of the mirrors is individually controlled by changing the memory contents of underlying addressing circuitry and mirror reset signals. Lens element 128 is tilted upwardly 6 degrees from the horizontal datum plane and rotated −10 degrees about the vertical axis to partly correct for distortion caused by oblique illumination of DMD 130. A beam direction turning mirror 132 positioned between an exit face of lens element 126 and an entrance face of lens element 128 turns the beam direction in an X-Z plane about 90 degrees within the housing of projection system 110.

Illumination light exiting lens element 128 enters prism assembly 140 that is comprised of a first or compensating prism 142 and a second or output prism component 144 that are spaced apart by an air space interface 146. Prism assembly 140 allows DMD to lie flat when in operation. Prism assembly 140 sets up the correct illumination angle on DMD 130 and separates by total internal reflection discrimination the illumination light from the imaging light reflected by DMD 130 in its on-state. The illumination angles for DMD 130 are controlled by the angles of the faces of prism assembly 140. Prism assembly 140 refracts and reflects the incident light bundle so that the DMD 130 is illuminated from a corner with a projection angle partly built into the output light bundle. After the illumination light reflects off DMD 130 in its on-state, imaging light exits prism assembly 140 along essentially the same propagation direction as that of illumination light entering prism assembly 140. Because of the many degrees of freedom in prism assembly 140, light can enter it roughly parallel to a support table and in line with a projection lens 147. In a preferred case, DMD 130 is mounted to the surface of a single printed circuit board 148 that covers the bottom of the projector. This provides a cost-effective solution because it eliminates the need for a high-density electrical connector otherwise required between printed circuit board 148 and an off-board DMD.

As described above, integrator tunnel 122 creates at its output end a uniform illumination pattern that facilitates delivering the illumination light past the motor of color wheel assembly 120. Because the output end of integrator tunnel 122 is imaged through prism assembly 140 and onto DMD 130 with minimal overfill, there is no practical place adjacent to the light path to place a color wheel synchronization photo detector for receiving scattered light without robbing DMD 130 of lumens.

Figure 3B:
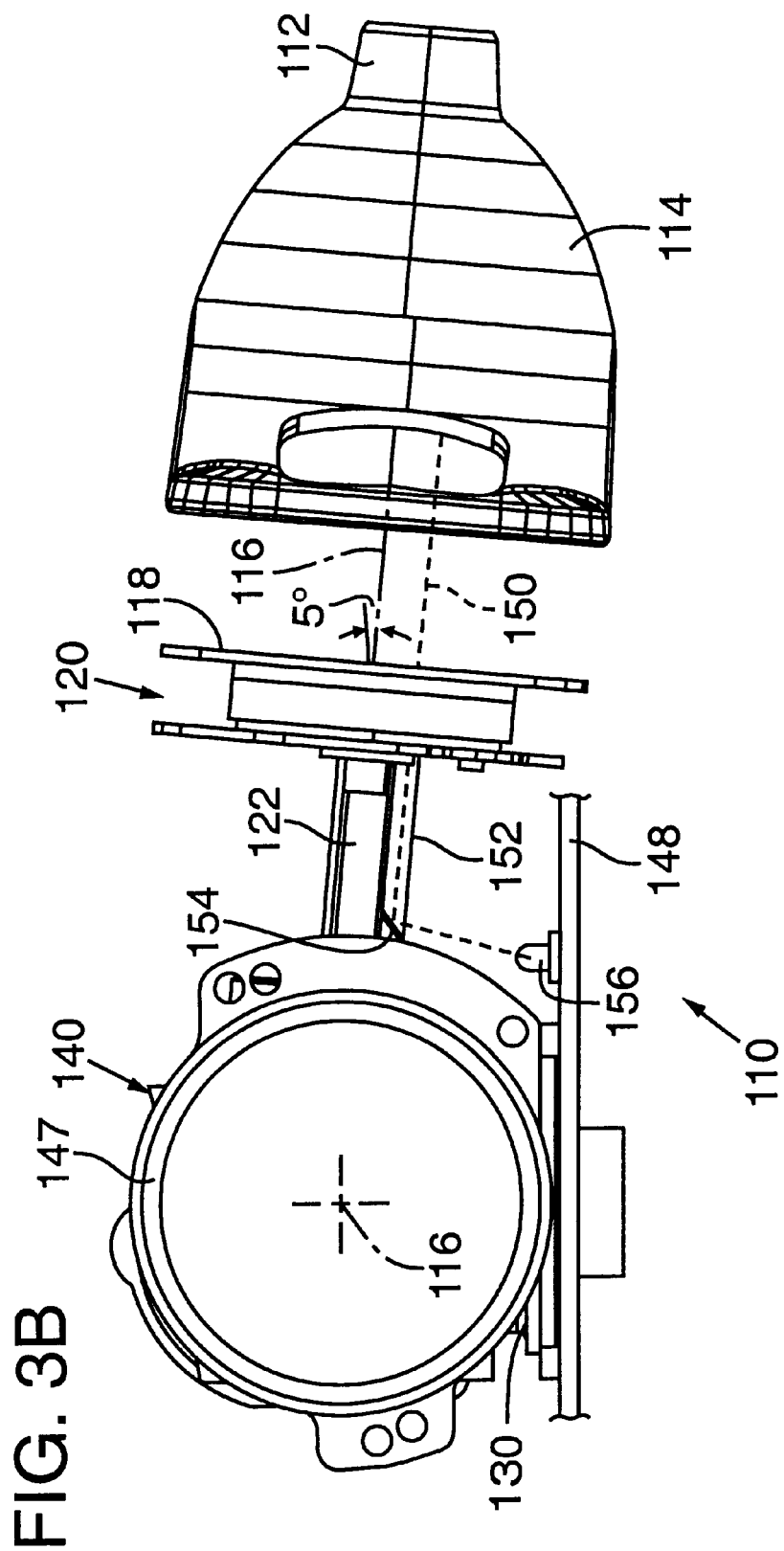
Figure 3C:
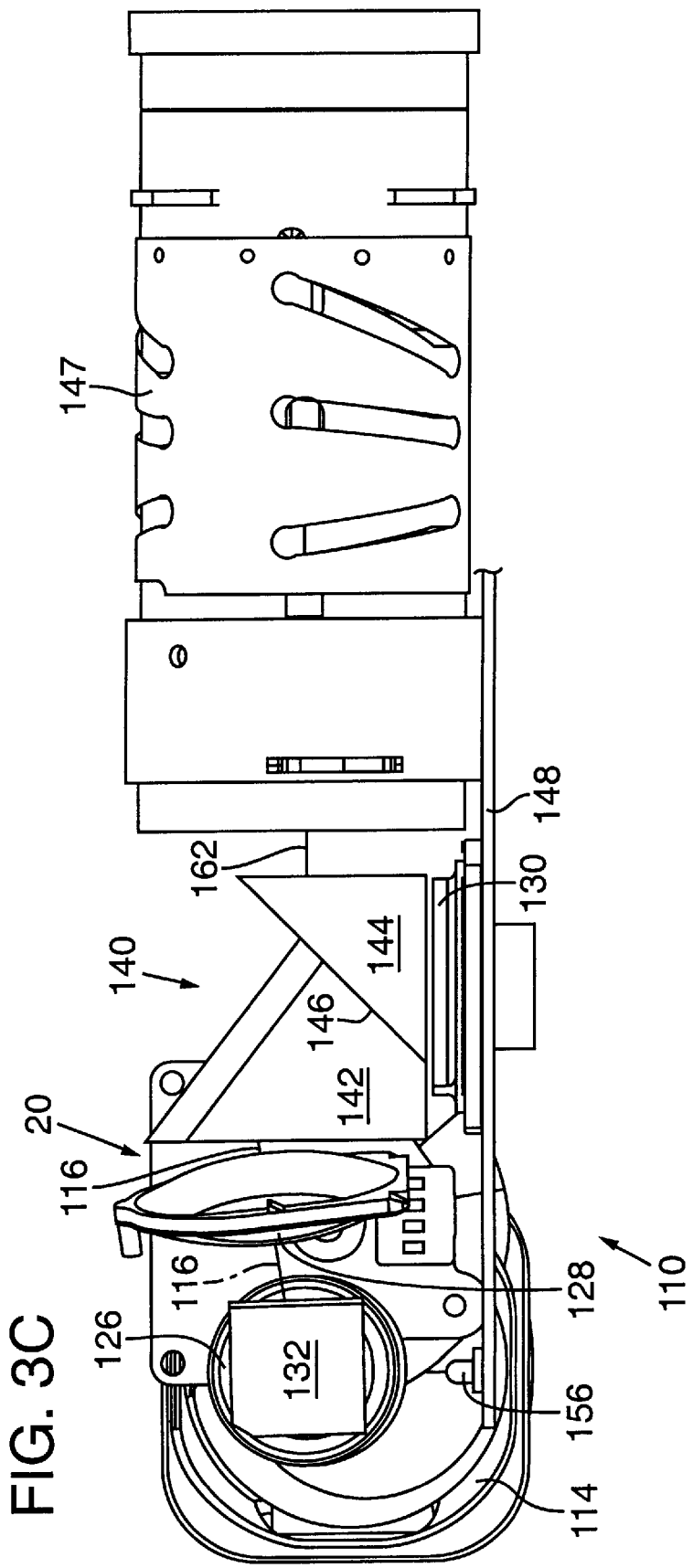
Figure 3E:
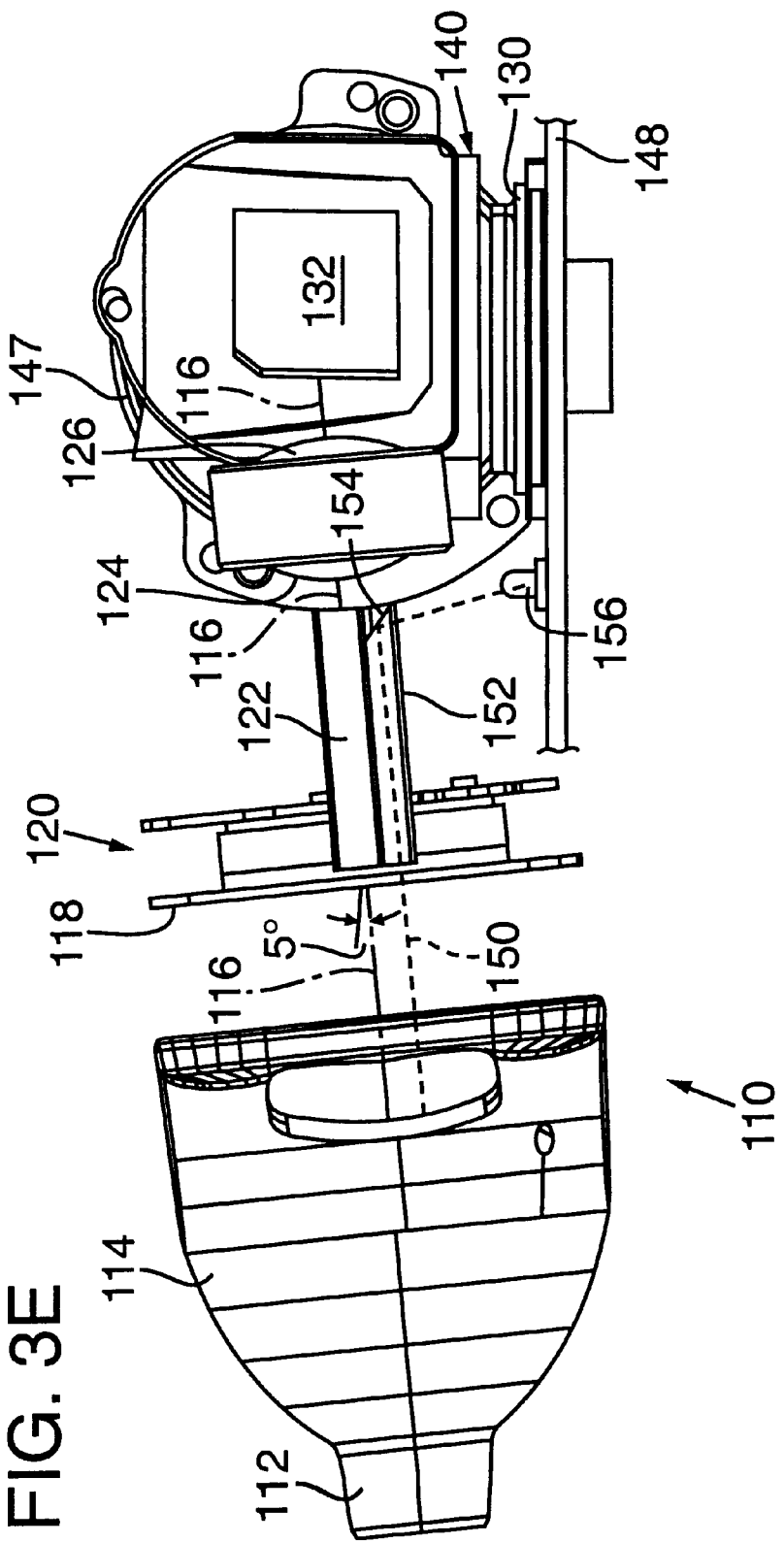

However, as best shown in FIGS. 3B and 3E, this invention senses otherwise wasted light rays as sensing rays 150 that are reflected by reflector 114 and propagate through color wheel assembly 120 at locations adjacent to integrator tunnel 122. To collect some of sensing rays 150, the upper surface of a light guide 152 is bonded to and positioned about 0.6 mm from the bottom surface of integrator tunnel 122. Light guide 152 preferably has an aperture of about 3.0 mm by 4.0 mm, is formed from solid glass, operates by TIR, and has a slanted output end 154 that is polished at an angle of about 50 degrees to normal to reflect (by TIR) sensing rays 150 out the bottom surface of light guide 152 and toward circuit board 148. A photo detector 156 is positioned on circuit board 148 to receive the maximum angle of incident sensing rays 150.

Because light guide 152 is positioned slightly below integrator tunnel 122, and because the color wheel angularly rotates its filter segments from light guide 152 toward integrator tunnel 122, photo detector 156 senses color changes slightly before they are received by DMD 130. This is advantageous because the resulting predictive timing is consistent from one projector to the next, thereby eliminating the need for a delay adjustment. Only a fixed delay is required for correct synchronization of color wheel assembly 120 color changes and the frame sequential color images driving DMD 130. The amount of fixed delay substantially equals the rotational latency time for color wheel assembly 120 to rotate from light guide 152 to integrator tunnel 122 plus the time required to process the color change sensed by photo detector 156 and its associated circuitry. Accordingly, maximum luminance efficiency and color purity is realized by image projection system 110.

Employing light guide 152 is also advantageous because it is firmly bonded against integrator tunnel 122 which strengthens them both and reduces their vulnerability to breakage during assembly and servicing.

Employing light guide 152 is further advantageous because it reflects sensing rays 150 through the air towards photo detector 156, which is separately mounted on circuit board 148. Because light guide 152 and photo detector 156 are separated, there is a much reduced chance of damaging either of them during assembly or servicing. Moreover, this protection comes without the cost of an additional connector and cabling and their associated assembly and testing.

Figure 2:
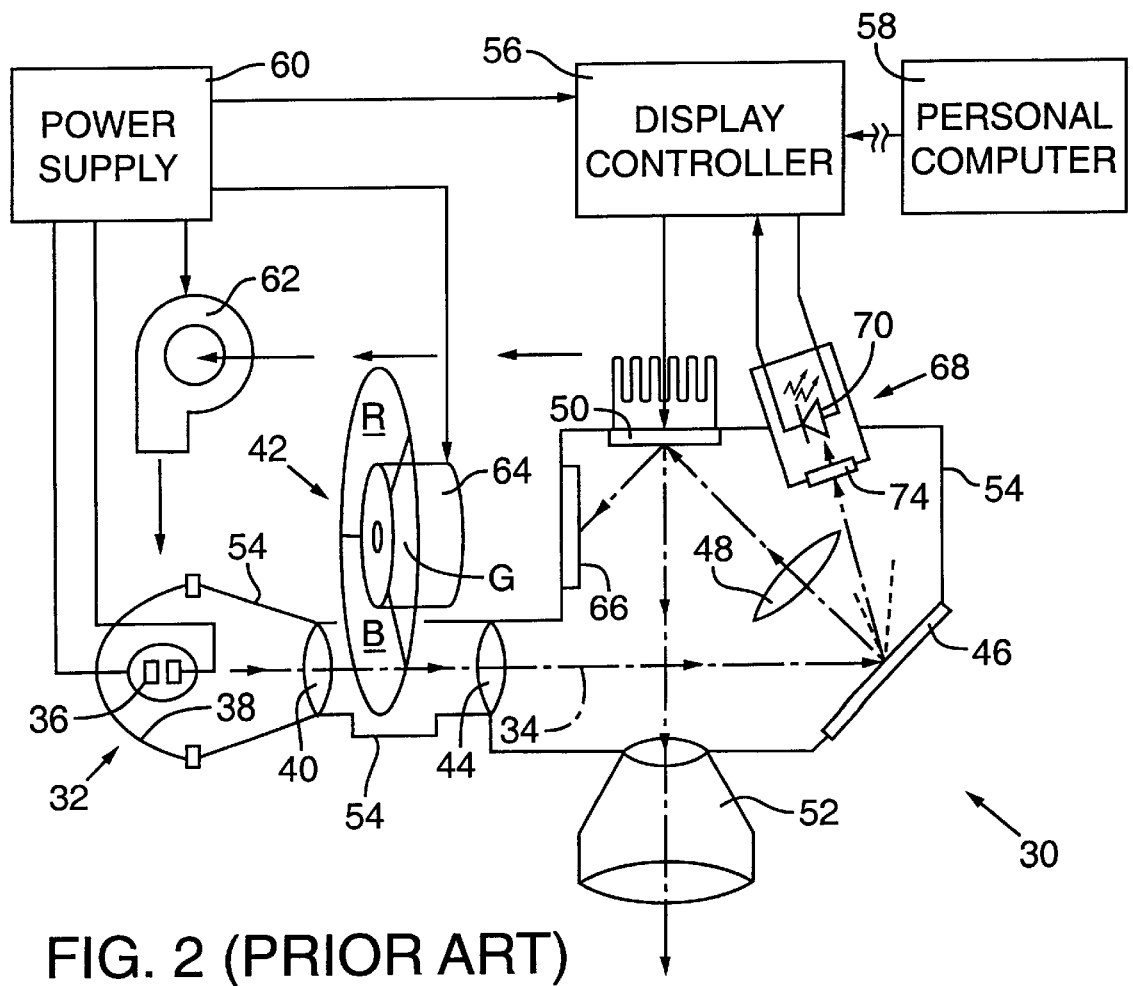
FIG. 2 is a simplified pictorial and electrical block diagram of a prior art multimedia projector showing a light path employing a color wheel synchronization technique that employs detection of scattered light.

Color wheel synchronization is achieved along the lines described with reference to FIG. 2, that is by detecting which color filter segment is in the light path and for how long. Particular colors of light propagating through the color wheel assembly are sensed to generate synchronization timing data.

Figure 4:
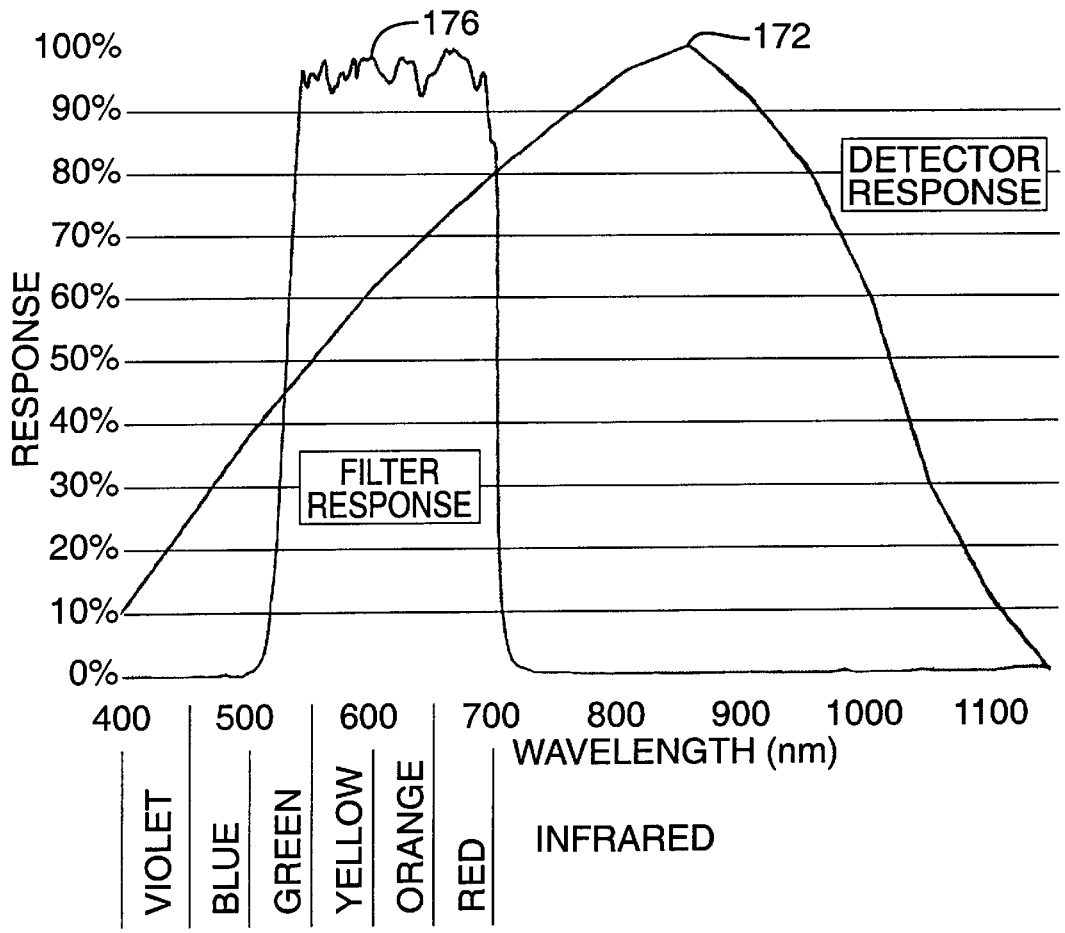
FIG. 4 graphically represents the spectral responses of an optoelectric detector and a filter employed in the color wheel synchronization technique of this invention.
Figure 5:
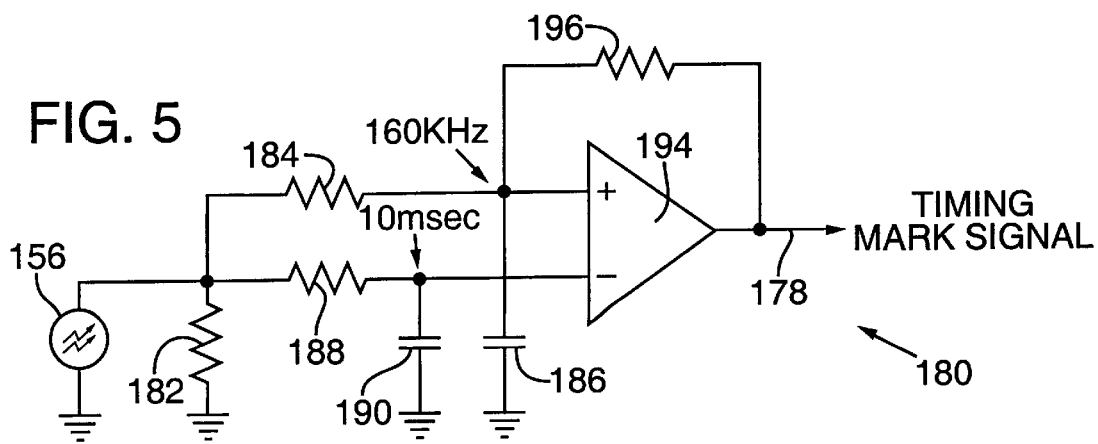
FIG. 5 is a simplified schematic circuit diagram of a timing mark signal generator that conditions, integrates, and threshold detects signals received from the optoelectric detector of FIG. 4.

However, in this invention, photo detector 156 is positioned to receive sensing rays 150 collected and reflected from light guide 152. Referring to FIGS. 4 and 5, photo detector 156 has a maximum spectral response 172 to deep red and near IR light wavelengths. Photo detector 156 is preferably a model SFH 203 manufactured by Siemens Components of Cupertino, Calif. Its spectral selectivity is tuned by an optical filter (not shown) inserted in the optical path between color wheel assembly 120 and photo detector 156. The optical filter is preferably a predominantly yellow filter having a filter response 176 that passes green, yellow, orange, and red wavelengths of light but attenuates blue and near IR wavelengths of light.

Color wheel assembly 120 includes filter segments R, G, and B that are typically separated by very narrow gaps, through which some of the polychromatic light emitted by high power lamp 112 may leak. Because polychromatic, red, and green light are all substantially propagated through the optical filter, photo detector 156 does not significantly discriminate between the polychromatic light leaking through the gaps and the light propagating through filter segments R and G. However, because the optical filter attenuates blue wavelengths of light, the entry and exit of filter segment B in optical path 34 is readily detected by photo detector 156. Moreover, because filter segment B immediately rotationally precedes filter segment R, the exit of filter segment B from the optical path is preferably used to generate a timing mark signal 178 for predicting the entry of filter segment R into alignment with integrator tunnel 122. Any polychromatic light propagating through the gap between filter segments B and R is simply interpreted by photo detector 156 as the start of filter segment R.

Figure 6:
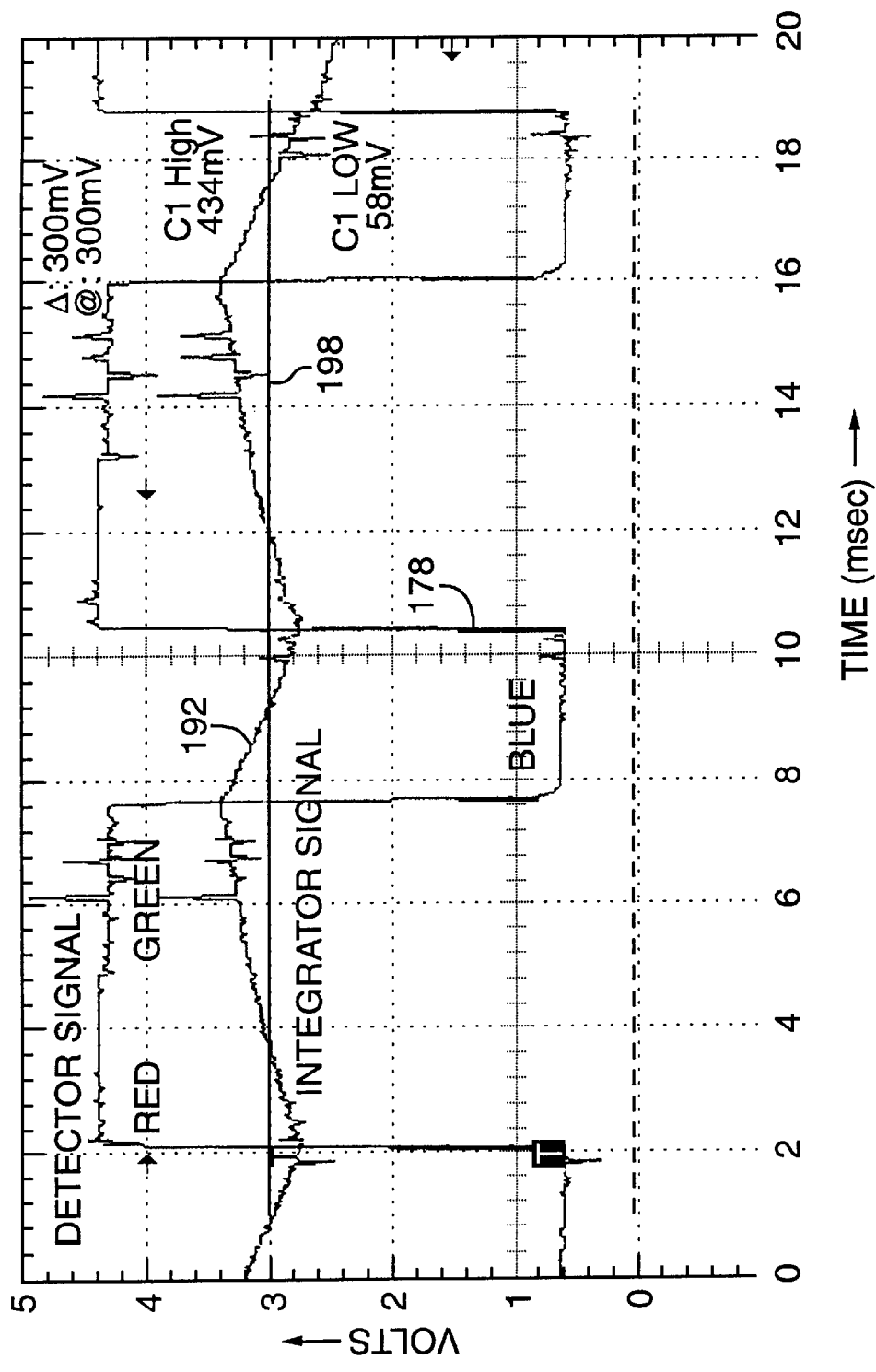
FIG. 6 graphically represents various electrical waveforms generated by the index mark signal generator of FIG. 5.

FIGS. 5 and 6 respectively show a timing mark signal generator 180 and timing waveforms suitable for use with this invention. Photo detector 156 generates a detector signal across a 10,000 ohm resistor 182, which detector signal is electrically connected to the respective filter and integrator inputs of timing mark signal generator 180.

The filter input includes a 10,000 ohm resistor 184 electrically connected in series with a 100 picoFarad capacitor 186 to form at their junction a low pass filter node having a 160 kilohertz cutoff frequency suitable for reducing bursty signal noise. A filtered detector signal appears at the low pass filter node.

The integrator input includes a 100,000 ohm resistor 188 electrically connected in series with a 0.1 microfarad capacitor 190 to form at their junction an integrator node having a 10 millisecond time constant suitable for integrating the detector signal. An integrated detector signal 192 appears at the integrator node.

The filter and integrator nodes are electrically connected to respective noninverting and inverting inputs of a comparator 194, which is preferably a type LM392 manufactured by National Semiconductor, Inc. of Mountain View, Calif.

Comparator 194 functions as a threshold comparator that compares the filtered detector signal appearing on the filter node to a threshold level, which is preferably integrated detector signal 192 that appears on the integrator node. Timing mark signal 178 appears at the output of comparator 194 as a nonsymmetrical squarewave having about a 0.6 volt "low" value when filter segment B is sensed and having about a 4.4 volt "high" value when filter segment B is not sensed (filter segment R or G or a gap is in optical path 34). A 3.32 megohm feedback resistor 196 is electrically connected between the output and noninverting input of comparator 194 to provide the threshold level with about a 20 millivolt hysteresis band. The hysteresis band increases the switching speed and improves the noise immunity of comparator 194.

Employing integrated detector signal 192 as a comparator threshold level provides an automatic threshold adjustment function that accounts for long-term changes in the intensity of high power lamp 112. Moreover, integrated detector signal 192 has an average value 198 that is indicative of the intensity of high power lamp 112. Because high power lamp 112 has an end-of-life time defined as the time when its intensity degrades to 50% of its original intensity, average value 198 can be monitored to predict when to replace high power lamp 112.

This invention is advantageous because the timing mark synchronization accuracy is independent of moderate illumination intensity changes, mechanical alignment errors, and color wheel rotational velocity changes.

The inherent simplicity and accuracy of the color wheel synchronization technique of this invention enables implementing a lighter weight, simpler, brighter, and less costly multimedia projector.

Skilled workers will recognize that portions of this invention may be implemented differently than the implementations described above for preferred embodiments. For example, this invention is suitable for use with many different optical paths, light sources, display devices, display controllers, and FSC data formats. The color wheel may have a variety of different filter segment colors, color combinations, and rotational sequence orders, and their individual angular widths may be unequal to compensate for different filter factors and light path-related color attenuations. Likewise, the light sensor may synchronize the display controller in many different ways including detecting the appearance or disappearance of any filter wheel segment color or combinations of colors. Finally, the timing mark signal generator is not limited to the particular circuit topology and values described.

Alternative embodiments of light guide 152 may include a lens attached to its light exiting surface to better focus light on photo detector 156. This added lens may be offset to redirect and focus the light to a more useful position, or may be wedge shaped (infinite radius of curvature) to simply redirect the light. Depending on the relative spacing and positioning of light guide 152 and photo detector 156, the added lens may have a predetermined radius and be offset from the longitudinal center of light guide 152 to focus and redirect the light toward photo detector 156.

Light guide 152 may alternatively be curved in a roughly elliptical shape to extend downwardly toward photo detector 156. The input and output apertures light guide 152 do not need to have the same cross sectional size or shape. The input aperture determines the color transition sharpness and the output aperture should be sufficiently large to optically couple to photo detector 156. The curved embodiment of light guide 156 has optical advantages, but is more susceptible to damage than the embodiments that are bonded, or otherwise attached, to integrator tunnel 122.

Skilled workers will further recognize that many changes may be made to the details of the above-described embodiments of this invention without departing from the underlying principles thereof. Accordingly, it will be appreciated that this invention is also applicable to color synchronization applications other than those found in multimedia projectors. The scope of this invention should, therefore, be determined only by the following claims.

What is claimed is:

1. An apparatus for synchronizing frame sequential color image data and color modulated light propagating from a color modulation device, comprising:

a light source emitting polychromatic light that propagates along an optical path and otherwise wasted light that propagates adjacent to the optical path;

a color modulation device positioned generally along the light path to change the polychromatic light into color modulated light and the wasted light into color modulated sensing light;

a light guide receiving the color modulated sensing light and propagating the color modulated sensing light out an exit surface of the light guide;

a photo detector positioned to receive the color modulated sensing light exiting the light guide, the photo detector causing generation of a timing mark signal in response to receiving predetermined wavelengths of the color modulated sensing light; and a display controller generating the frame sequential color image data in response to receiving the timing mark signal.

2. The apparatus of claim 1 further including a display device that receives the frame sequential color image data and the color modulated light and responds by producing a displayable color image.

3. The apparatus of claim 2 in which the apparatus is employed in a multimedia projector.

4. The apparatus of claim 2 in which the display device is one of a digital micro mirror device, a liquid crystal device, and a reflective complementary metal oxide semiconductor array.

5. The apparatus of claim 1 in which the color modulation device is a color wheel.

6. The apparatus of claim 5 in which the color wheel includes red, green, and blue filter segments.

7. The apparatus of claim 5 in which the color wheel is rotated by a free-running motor.

8. The apparatus of claim 5 in which the light guide is spaced apart from the optical path such that a wavelength change in the color modulated sensing light is detected a time period prior to the wavelength change occurring in the color modulated light, the time period being a predictive time period used to synchronize generation of the color image data to the wavelength change occurring in the color modulated light propagating along the optical path.

9. The apparatus of claim 1 in which the light guide has a elongated tubular shape with input and output apertures.

10. The apparatus of claim 9 in which the input aperture is substantially rectangular.

11. The apparatus of claim 9 in which the light guide has a slanted end that reflects the color modulated sensing light out the exit surface of the light guide and toward the photo detector.

12. The apparatus of claim 11 further including a lens that is attached to the exit surface of the light guide to at least one of focus and redirect the color modulated sensing light toward the photo detector.

13. The apparatus of claim 1 in which the light guide has a cursed tubular shape.

14. The apparatus of claim 1 further including a circuit board and in which the photo detector and the display controller are mounted to the circuit board.

15. A method for synchronizing frame sequential color image data and color modulated light propagating from a color modulation device, comprising:

emitting polychromatic light that propagates along an optical path and otherwise wasted light that propagates adjacent to the optical path;

positioning a color modulation device generally along the light path to change the polychromatic light into color modulated light and the wasted light into color modulated sensing light;

providing a light guide that receives the color modulated sensing light and propagates the color modulated sensing light out an exit surface of the light guide;

positioning a photo detector to receive the color modulated sensing light exiting the light guide;

generating a timing mark signal in response to the photo detector receiving predetermined wavelengths of the color modulated sensing light; and displaying the frame sequential color image data in response to receiving the timing mark signal.

16. The method of claim 15 further including providing a display device that receives the frame sequential color image data and the color modulated light and responds by producing a displayable color image.

17. The method of claim 15 in which the color modulation device is a color wheel.

18. The method of claim 17 further including:

spacing the light guide apart from the optical path;

detecting a wavelength change in the color modulated sensing light a time period prior to the wavelength change occurring in the color modulated light; and waiting about the time period before displaying the frame sequential color image data.

19. The method of claim 15 further including providing a circuit board and mounting the photo detector and the display controller to the circuit board.

* * * * *

UNITED STATES PATENT AND TRADEMARK OFFICE
CERTIFICATE OF CORRECTION

PATENT NO.    : 6,155,687
DATED         : December 5, 2000
INVENTOR(S)   : Mark Peterson It is certified that error appears in the above-identified patent and that said Letters Patent is hereby corrected as shown below:

Column 3,
Line 12, "liming" should read -- timing --.

Claim 13, column 9,
Line 38, "cursed" should read -- curved --.

Signed and Sealed this

Second Day of October, 2001

Attest:

NICHOLAS P. GODICI
Attesting Officer    Acting Director of the United States Patent and Trademark Office